(12) United States Patent
Frontali et al.

(10) Patent No.: US 10,740,582 B1
(45) Date of Patent: Aug. 11, 2020

(54) GENERIC SHAPE QUALITY VERIFICATION PROCESS FOR A MARK AND READ SYSTEM

(71) Applicant: Datalogic IP Tech, S.r.l., Bologna (IT)

(72) Inventors: Federico Frontali, Imola (IT); Enrico Campaioli, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 17 days.

(21) Appl. No.: 16/253,994

(22) Filed: Jan. 22, 2019

(51) Int. Cl.
*G06K 7/14* (2006.01)

(52) U.S. Cl.
CPC ......... *G06K 7/1413* (2013.01); *G06K 7/1417* (2013.01)

(58) Field of Classification Search
CPC ........................... G06K 7/1413; G06K 7/1417
USPC ....................................................... 235/462.1
See application file for complete search history.

(56) References Cited

U.S. PATENT DOCUMENTS

| | | | |
|---|---|---|---|
| 8,108,176 B2 | 1/2012 | Nadabar et al. | |
| 9,552,506 B1 | 1/2017 | Nadabar et al. | |
| 2010/0201114 A1* | 8/2010 | Fields | B42D 25/29 283/70 |
| 2018/0157887 A1 | 6/2018 | D'Ercoli et al. | |
| 2018/0157888 A1* | 6/2018 | D'Ercoli | G06K 7/10 |

FOREIGN PATENT DOCUMENTS

CN 101998136 3/2011

\* cited by examiner

*Primary Examiner* — Toan C Ly
(74) *Attorney, Agent, or Firm* — Cozen O'Connor

(57) ABSTRACT

A generic shape quality verification process that allows the generalization of Association for Automatic Identification and Mobility (AIM) Direct Part Mark (DPM)/International Organization for Standardization (ISO)/International Engineering Consortium (IEC) (ISO/IEC) 29158 quality metrics for a generic shape marked or marked with a generic technique, wherein the AIM-DPM/ISO-IEC 29158 quality metrics, e.g., Cell Contrast, Cell Modulation, Grid Non Uniformity, Axial Non Uniformity, Fixed Pattern Damage, Unused Error Correction, and Print Growth are generalized to permit verification of a generic shape, are generalized to permit verification of a generic shape, where the process in accordance with the invention consists of the following three steps, i.e., (i) configuration, (ii) calibration and iii) work such that based on computed AIM-DPM/ISO-IEC 29158 metrics, it is possible to verify whether quality of the printed layout is acceptable.

10 Claims, 10 Drawing Sheets

FIG. 5(a)
FIG. 5(b)
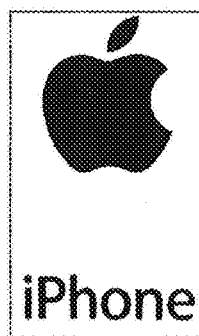
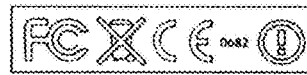

iPhone

| | | |
|---|---|---|
| Grid Size 1px | iPhone | Detail size ≈ 4 px |
|  | | |
| Grid Size 2px | iPhone | Detail size ≈ 2 px |
|  | | |
| Grid Size 4px | iPhone | Detail size ≈ 1 px |
|  | | |
| Grid Size 8px | iPhone | Detail size < 1 px |

GENERIC SHAPE QUALITY VERIFICATION PROCESS FOR A MARK AND READ SYSTEM

BACKGROUND OF THE INVENTION

1. Field of the Invention

The present invention relates to the field of laser marking and reading and, more particularly, to a generic shape quality verification process for a mark and read system.

2. Description of the Related Art

Laser marking is well known as the most effective solution to achieve reliable traceability in the supply chain, with high resolution, high contrast, counterfeit-proof high contrast, codes that require no consumables, no mechanical part contact and high throughput. Additionally, today's industries require 100% validation of engraved codes to ensure consistency and coherence of data and classification of the code into quality classes.

In general, techniques of pattern matching execution between a reference model and ideal image are known. It also known to perform verification of the marking quality via simple pattern matching techniques. Checking the quality of a mark is critical in marking jobs, such as in laser marking applications.

In general, however, mark quality verification specifications are only defined for a very narrow class of one dimensional (1D) and two-dimensional (2D) barcode symbologies.

There is a need to generalize the verification for any markable shape (e.g., symbols, letters or logos) because the mark quality must refer only to the marking itself and not to the shape of the marking. The most widely used 2D codes Direct Part Mark (DPM) quality grading metrics to date are the International Organization for Standardization (ISO)-International Engineering Consortium (IEC) (ISO-IEC) Standard 29158 (Association for Automatic Identification and Mobility (AIM)-Direct Part Mark (AIM-DPM)). Generally, use of the output metrics of this standard to produce a Generic Shape Quality Verification is advantageous because (i) most of these metrics contains information that can be measured for every 2D shape and not only for 2D barcodes and (ii) these metrics are extremely well known in mark and read applications.

U.S. Pat. No. 8,108,176 discloses a method and system for applying a two-dimensional mark on a first surface of a component and assessing mark quality, where the method includes the steps of positioning a component with a first surface at a first station, applying a two dimensional mark to the first surface at the first station, obtaining an image of the applied two-dimensional mark at the first station, performing a mark quality assessment on the obtained image and performing a secondary function as a result of the mark quality assessment.

U.S. Pat. No. 9,552,506 also discloses a method for verifying the quality of two-dimensional identification marks placed on the surface of a part or component. Here, the overall grade, and diagnostic information is provided to assess the performance of the process used to place the mark on the part.

CN 101998136 discloses a homography matrix acquisition method as well as an image pickup equipment calibrating method and device.

In such conventional mark and read systems, the only information shared at run-time between the marker and the code grader is the trigger sent by the marker after the marking procedure. In the foregoing systems, moreover, it is possible to easily replace the marker or code grader with a different device to achieve the desired performance level. In any event, such a system requires multiple components, which entails increased costs, increased processing time and reduced efficiencies.

SUMMARY OF THE INVENTION

Disclosed is a generic shape quality verification process that allows the generalization of Association for Automatic Identification and Mobility (AIM) Direct Part Mark (DPM)/International Organization for Standardization (ISO)/International Engineering Consortium (IEC) (ISO/IEC) 29158 quality metrics for a generic shape marked or marked with a generic technique.

In accordance with the invention, the AIM-DPM/ISO-IEC 29158 quality metrics, e.g., Cell Contrast, Cell Modulation, Grid Non Uniformity, Axial Non Uniformity, Fixed Pattern Damage, Unused Error Correction, and Print Growth—measure of symbol ink-spread or ink-shrinkage are generalized to permit verification of a generic shape, are generalized to permit verification of a generic shape.

The process in accordance with the invention consists of the following three steps, i.e., (i) configuration, (ii) calibration and iii) work. Here, configuration comprises creating a layout prototype. After the layout prototype is created, fixed parts are defined in the layout prototype. Variable parts V.1 in the layout prototype are also defined.

For each defined part, a "detail size" is then defined, where it is necessary to explore each dimension defined as a detail size (see FIG. 5($d$)). In continuance of the configuration process, a quality grading grid is created within all defined parts of the layout prototype. After the quality grading grid is created, a verification structure is created. Here, for each defined part the image (i.e., the layout prototype) is divided via the grid defined by the detail size. It is at this point that the defined layout prototype and its verification structure is forwarded from the marker to, i.e., shared with, the code reader, such that both the marker and the code reader are provided with this data.

The calibration procedure of the process is performed to calibrate the code reader to a reference point so as to compensate for the tilt that is inherent to the code reader. In an embodiment, a machine vision homography calibration process is implemented. Here, the pixel coordinate system of the scan head is mapped to a "world" coordinate system. This mapping defines the relationship between a distance measured in pixels in the scan head versus the actual distance in inches or millimeters of an object being imaged. This allows the application of this homography to verification structures and therefore to also use this quality grading algorithm with skewed acquisition systems.

After the calibration procedure is performed, the work process is implemented. This includes creating a layout, automatically recreating a new verification structure for the variable part, marking the layout, and capturing an image with the marked layout. The work process also includes a verification. Here, verification algorithms implemented in the AIM-DPM/ISO-IEC 29158 specification are reproduced. Thus, starting from this, a 2D code grid verification structure is replaced with a verification structure and the binary value of a code grid module is replaced with the binary value obtained from the created layout.

Using this "new grid concept", for each grid, it becomes possible to compute the AIM-DPM/ISO-IEC 29158 metrics: Cell Modulation, Cell Contrast, Grid Non Uniformity, Axial Non Uniformity, Fixed Pattern Damage and Print Growth. As specified in the AIM-DPM/ISO-IEC 29158 standard, these parameters can be real numbers, such as 1, 2, 3 . . . n. Alternatively, a letter grade can be used instead, such as A, B, C, D, E, F. Based on the computed AIM-DPM/ISO-IEC 29158 metrics, it is thus possible to verify whether quality of the layout is acceptable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The various features, functions and advantages characterizing the invention will be better understood by reference to the detailed description which follows, taken in conjunction with the accompanying drawings, in which:

FIGS. 5(a) to 5(e) show the show layouts created pursuant to performing the configuration in accordance with the invention;

DETAILED DESCRIPTION OF THE EXEMPLARY EMBODIMENTS

Figure 1:
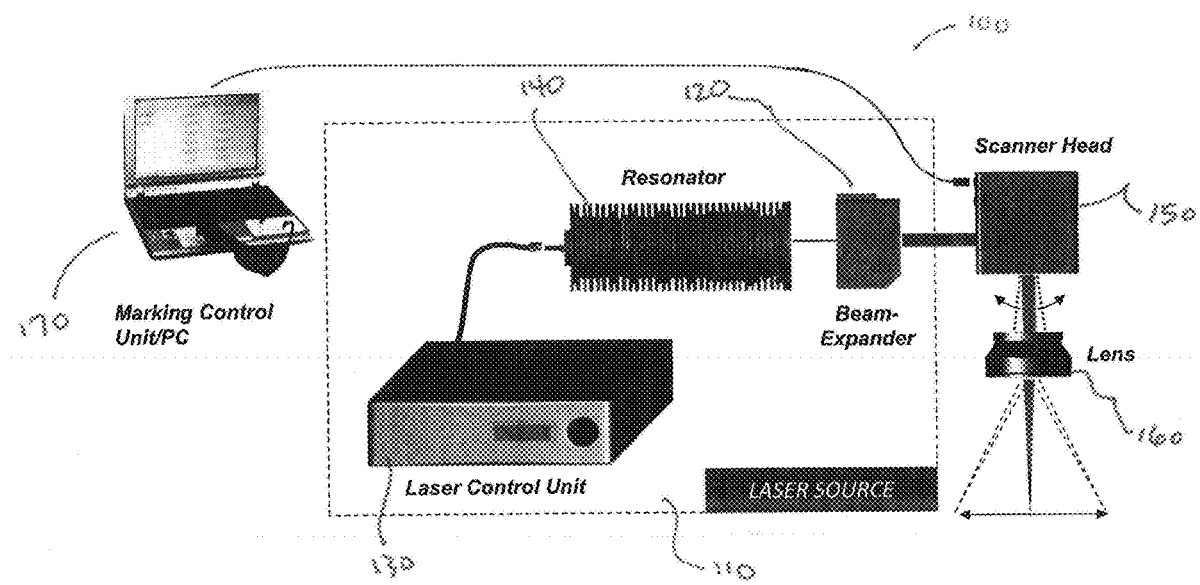
FIG. 1 is an illustration of an exemplary laser marker system.

With reference to FIG. 1, shown therein is an exemplary laser marker system 100 in which the method in accordance with the invention is implemented. The laser marker system 100 includes three major components, e.g., a laser source 110 of suitable wavelength, which generates a marking laser beam. As seen in FIG. 1, the laser source 110 includes a mechano-optical component comprising a beam expander 120, a laser control unit 130 and a resonator 140 coupled between the beam expander 120 and the laser control unit 130.

The laser marker system 100 additionally includes a scanner head 120 that deflects the marking laser beam via galvo-controlled (motorized) mirrors (not shown) through a field focusing lens 130 and marking software (trajectory plotting control software) that translates layout capabilities into laser pulses. With such a system 100, laser marking is achieved by delivering and focusing the marking laser beam on a target surface via the galvo-controlled (motorized) mirrors controlled by dedicated software. It should be noted a complete solution must not only include suitable laser emission controls, but also beam shot generation, and trajectory control software.

Figure 2:
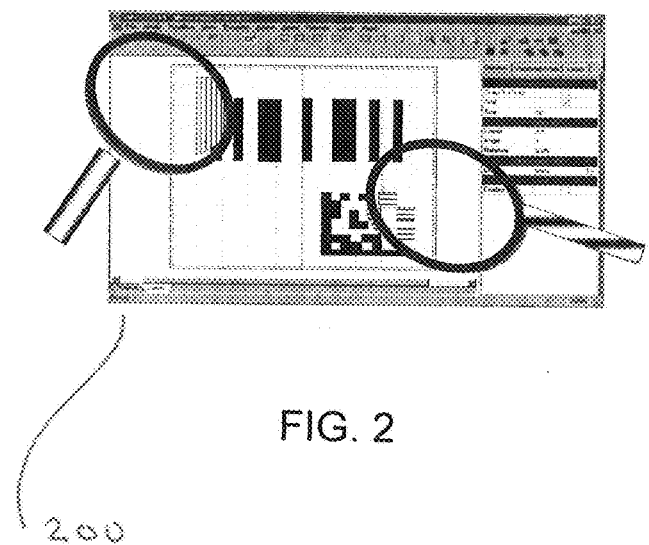
FIG. 2 is an illustration of a graphical user interface via which a marking layout is defined by an operator in accordance with the invention.

In use, the trajectory control software is used by an operator to define a marking layout via a graphical user interface 200 (see FIG. 2) implemented on a control device 170, such as a marking control unit, personal computer, workstation or industrial process controller. Real-time control of the laser source 110 and scan 120 is performed by embedded marking software executing on the system 100.

The marking software converts graphic vectors into paths, such as parallel lines, to be traced by moving the galvo-controlled mirrors and switching the marking laser beam on and off, accordingly.

It should be understood the terms "scanner head", "camera", "code reader", "grader", "reader" and "image reader" all refer to devices that acquire images and within the instant disclosure these terms are interchangeable.

Figure 3:
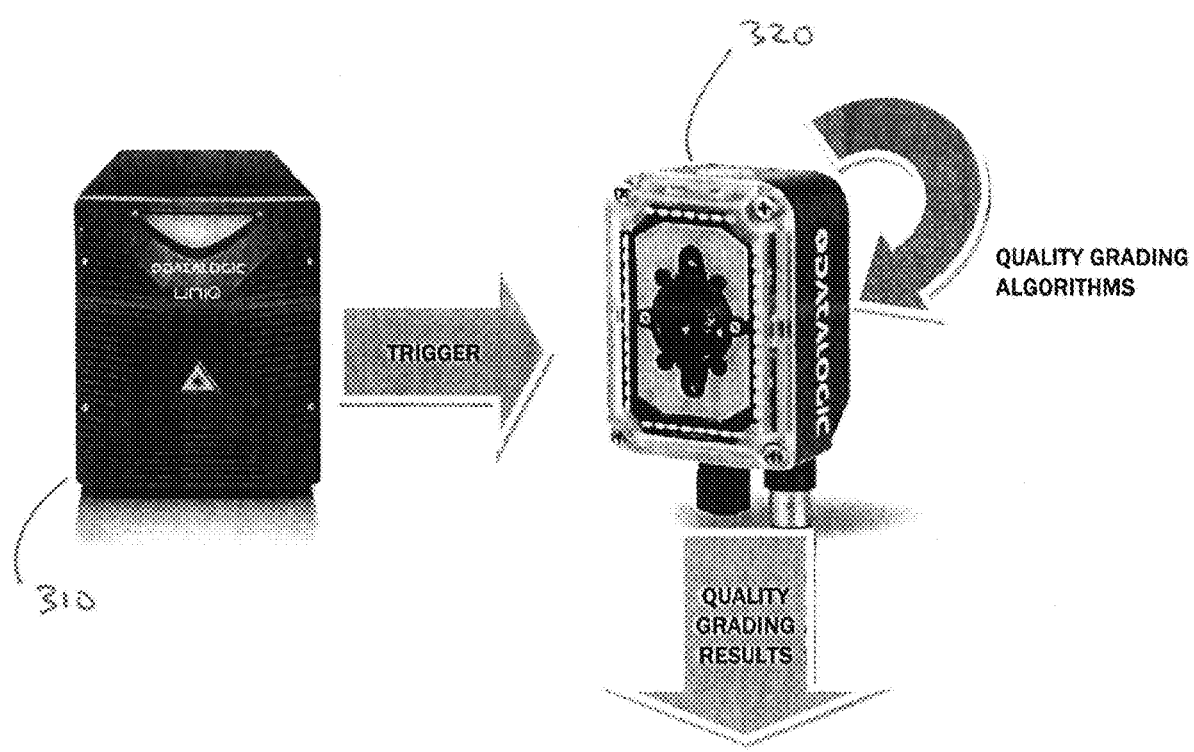
FIG. 3 is an illustration of a conventional marker and conventional code grader.

FIG. 3 is a schematic illustration of a conventional marker 310 and code grader 320. In use, the only information shared between these two conventional devices at run-time is the trigger sent by the marker 310 after the marking procedure is completed. This trigger begins the grading process that is implemented by the code grader 320 to check the mark quality. In this scenario, it is possible to easily replace the conventional marker 310 or code grader 320 with a different device to achieve the desired performance level, which is some circumstance is undesirable. Moreover, conventional system providing with a marker 310 and code grader 320 operating in the known manner entails increased costs, increased processing time and reduced efficiencies.

Figure 4:
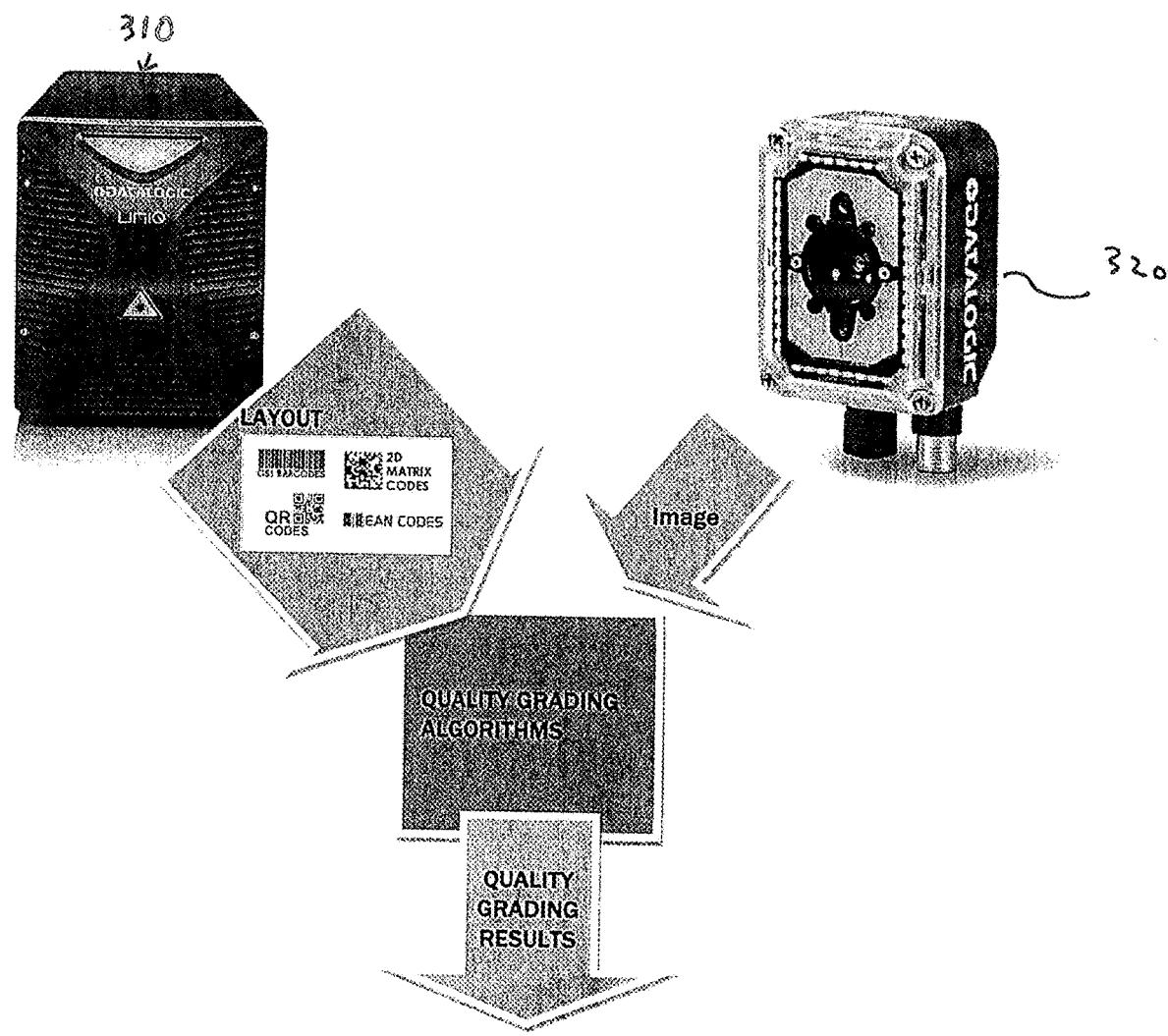
FIG. 4 is an illustration of the use of the effect of the generic shape quality verification process in accordance with the invention in which the information shared between the marker and the quality grading device also contains the marked layout.

FIG. 4 is a schematic illustration of the use of the effect of generic shape quality verification process in accordance with the invention in which the information shared between the marker 310 and code grader 320 also contains the marked layout such that the quality of marking can be verified on any type of surface for any type of shape, which maintains the stability and reliability of DPM metrics developed for 2D codes.

The generic shape quality verification process is a method that allows the generalization of Association for Automatic Identification and Mobility (AIM) Direct Part Mark (DPM) (AIM-DPM)/International Organization for Standardization (ISO)/International Engineering Consortium (IEC) (ISO-IEC) 29158 quality metrics for a generic shape marked or marked with a generic technique.

The AIM-DPM/ISO-IEC 15415 quality guideline improves upon the standard for 2-D barcodes and is intended to specifically handle the variety of marking techniques and part materials used in DPM applications.

ISO/IEC TR 29158 is an engineering document intended for verifier manufacturers and application specification developers.

This standard describes modifications which are to be considered in conjunction with the symbol quality methodology defined in ISO/IEC 15415 and a symbology specification. It defines alternative illumination conditions, some new terms and parameters, modifications to the measurement and grading of certain parameters, and the reporting of the grading results.

ISO/IEC TR 29158 was developed to assess the symbol quality of direct marked parts, where the mark is applied directly to the surface of the item and the reading device is a two-dimensional imager. When application specifications allow, this method may also be applied to symbols produced by other methods. This is appropriate when direct part marked (DPM) symbols and non-DPM symbols are being scanned in the same scanning environment. The symbol grade is reported as a DPM grade rather than as an ISO/IEC 15415 grade.

ISO/IEC 15415 specifies two methodologies for the measurement of specific attributes of two-dimensional bar code symbols, one of these being applicable to multi-row bar code symbologies and the other to two-dimensional matrix symbologies, defines methods for evaluating and grading these measurements and deriving an overall assessment of symbol quality, and provides information on possible causes of deviation from optimum grades to assist users in taking appropriate corrective action.

ISO/IEC 15415 applies to those two-dimensional symbologies for which a reference decode algorithm has been defined, but its methodologies can be applied partially or wholly to other similar symbologies.

While ISO/IEC 15415 can be applied to direct part marks, it is possible that better correlation between measurement results and scanning performance will be obtained with ISO/IEC 29158 in combination with ISO/IEC 15415.

The AIM-DPM/ISO-IEC 29158 quality metrics are:

Cell Contrast—measures the mean contrast between symbol color and background;

Cell Modulation—measures the minimum distance of a single region between its color and a symbol threshold;

Grid Non Uniformity—measures the maximum deviation of each symbol part from its correct position;

Axial Non Uniformity—measures the maximum height or width deviation of the real symbol dimension from the mean symbol dimension;

Fixed Pattern Damage—measures the damages to symbol fixed parts (i.e., the one that does not change between two subsequent marks);

Unused Error Correction—measures how many errors are contained in the information part of the symbol (Specific for Barcode Verification Algorithm); and Print Growth—measure of symbol ink-spread or ink-shrinkage.

All metrics except Unused Error Correction retain the same meaning when referring to a generic shape rather than a 2D barcode symbology as stated in AIM-DPM/ISO-IEC 29158 standard. In accordance with the invention, the foregoing metrics are generalized to permit verification of a generic shape.

The process in accordance with the invention consists of the following three steps, i.e., (i) configuration, (ii) calibration and iii) work. With reference to FIGS. 5(a) to 5(e), configuration comprises creating a layout prototype 500. Shown in FIG. 5(a), for illustrative purposes, is a layout prototype 500 consisting of exemplary markings typically provided on the rear of a mobile device, such as an iPhone manufactured and sold by Apple Inc. It should be understood the layout prototype 500 can be any shape, symbols, letters or logos, and it is not the intention to be limited to the presently illustrated symbols, letters and logos.

Figure 5C:
Figure 5C:

After the layout prototype 500 is created, fixed parts F.1, F.2, F.3 are defined in the layout prototype (FIG. 5(b)). Here, the respective fixed parts F.1, F.2, F.3 are shown enclosed in rectangular boxes to represent each defined fixed part. Variable parts V.1 in the layout prototype are now also defined (FIG. 5(c)).

Figure 5D:
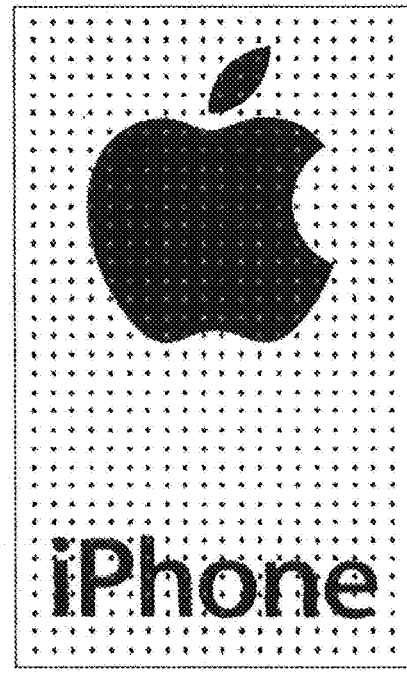
Figure 5D:
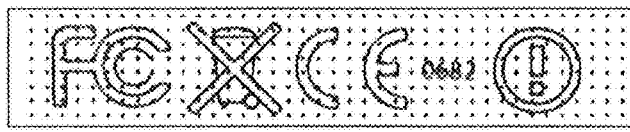

For each defined part F.1, F.2, F.3, V1, a "detail size" is now defined, where it is necessary to explore each dimension defined as a detail size (see FIG. 5(d)). In practice, the detail size must not be less than 3 pixels in the acquired image. Consequently, the acquisition system must be established such that the resultant detail size is greater than 3 pixels.

Figure 5E:
Figure 5E:
Figure 5E:

This is best understood with reference to FIG. 5(e), which shows that if the detail size is greater than 3 pixels (grid size 1 px), then visibility of any defect in at least one node is assured (see circle on letter "e" at detail size=4 pixels).

In continuance of the configuration process, a quality grading grid is now created within all defined parts F.1, F.2, F.3, V1 of the layout prototype. After the quality grading grid is created, a verification structure is now created. Here, for each defined part the image (i.e., the layout prototype 500) is divided via the grid defined by the detail size. The grid at this stage is composed of nodes, where each node contains its position in the grid and its node type, such as black, white or edges. It is at this point that the defined layout prototype and its verification structure is forwarded from the marker to, i.e., shared with, the code reader, such that both the marker and the code reader are provided with this data.

Figure 6:
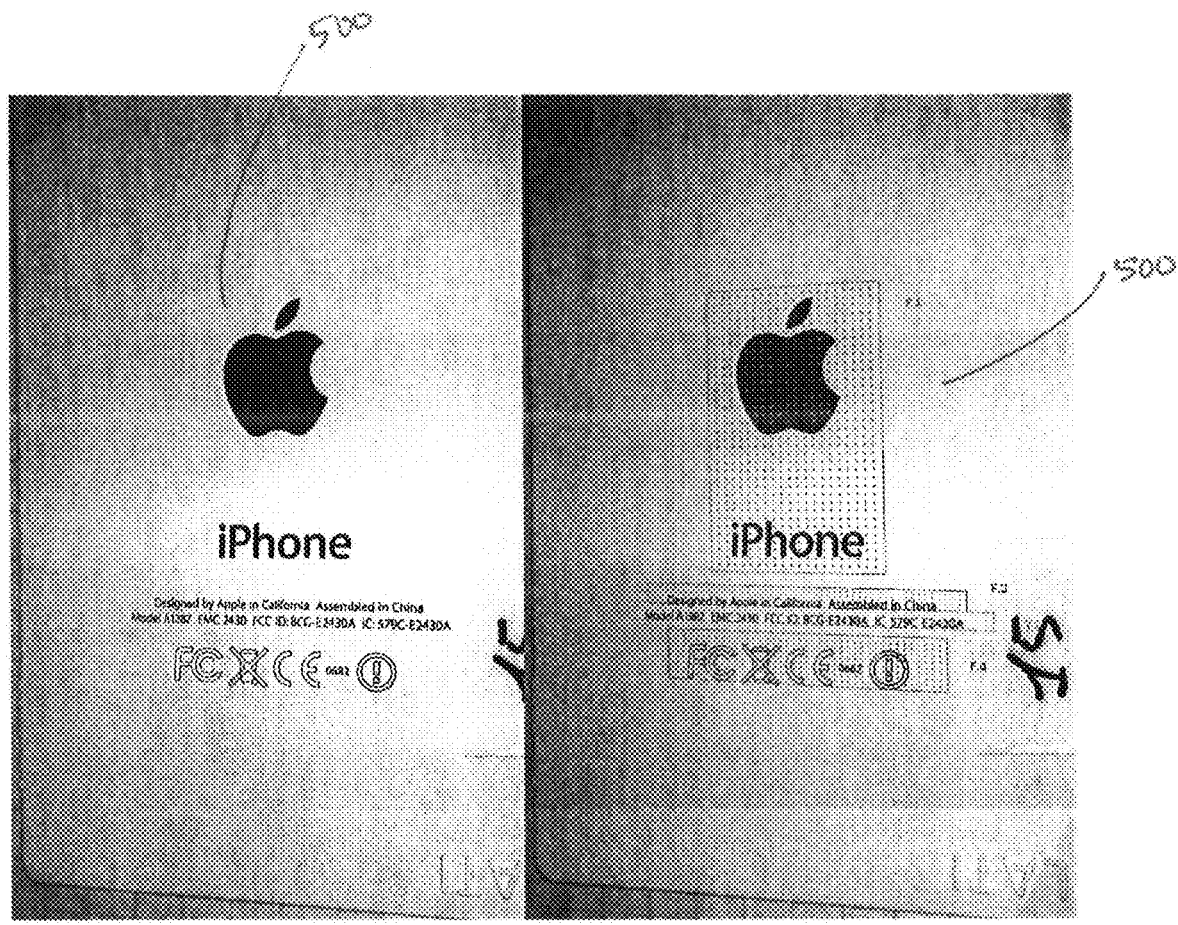
FIG. 6 is illustration of layouts pursuant to implementing the calibration procedure in accordance with the invention.

The calibration procedure of the process is now performed to calibrate the code reader to a reference point so as to compensate for the tilt that is inherent to the code reader. In an embodiment, a machine vision homography calibration process is implemented. Here, the pixel coordinate system of the scan head is mapped to a "world" coordinate system. This mapping defines the relationship between a distance measured in pixels in the scan head versus the actual distance in inches or millimeters of an object being imaged. This allows the application of this homography to verification structures and therefore to also use this quality grading algorithm with skewed acquisition systems (FIG. 6). Here, however, it is not required to print a ground truth sample, i.e., a sample having a known print grade. Homography calibration processes are generally known, and are beyond the scope of the instant application and, therefore, they will not be discussed in detailed herein.

Figure 7:
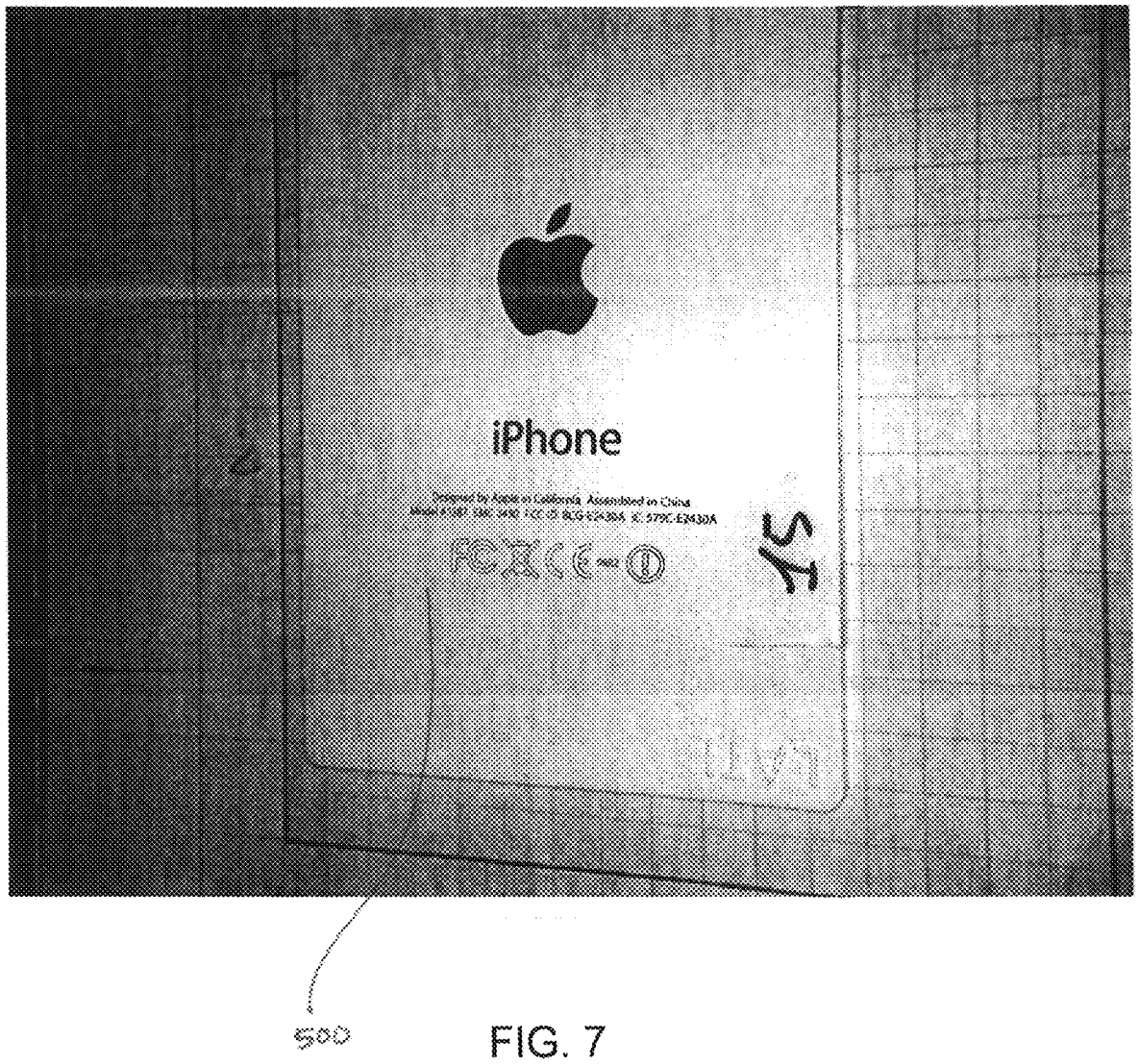
FIG. 7 is an illustration of marked image prior to verification in accordance with invention.

After the calibration procedure is performed, the work process is implemented. This includes creating a layout, automatically recreating a new verification structure for the variable parts V1, marking the layout, and capturing an image with the marked layout (in the image shown in FIG. 7, the layout is printed on a hard plastic). The work process also includes a verification. Here, verification algorithms implemented in the AIM-DPM/ISO-IEC 29158 specification are reproduced. Thus, starting from this, the 2D code grid verification structure is replaced with the verification structure and the binary value of the code grid module is replaced with the binary value obtained from the created layout.

Using this "new grid concept", for each grid (see F1, F2, F3 and V1 in FIG. 8), it becomes possible to compute with some precautions, the following AIM-DPM/ISO-IEC 29158 metrics: Cell Modulation, Cell Contrast, Grid Non Uniformity, Axial Non Uniformity, Fixed Pattern Damage and Print Growth. As specified in the standard, these parameters can be real numbers, such as 1, 2, 3 . . . n. Alternatively, a letter grade can be used instead, such as A, B, C, D, E, F. Based on the computed AIM-DPM/ISO-IEC 29158 metrics, it is thus possible to verify whether quality of the layout is acceptable.

Figure 8:
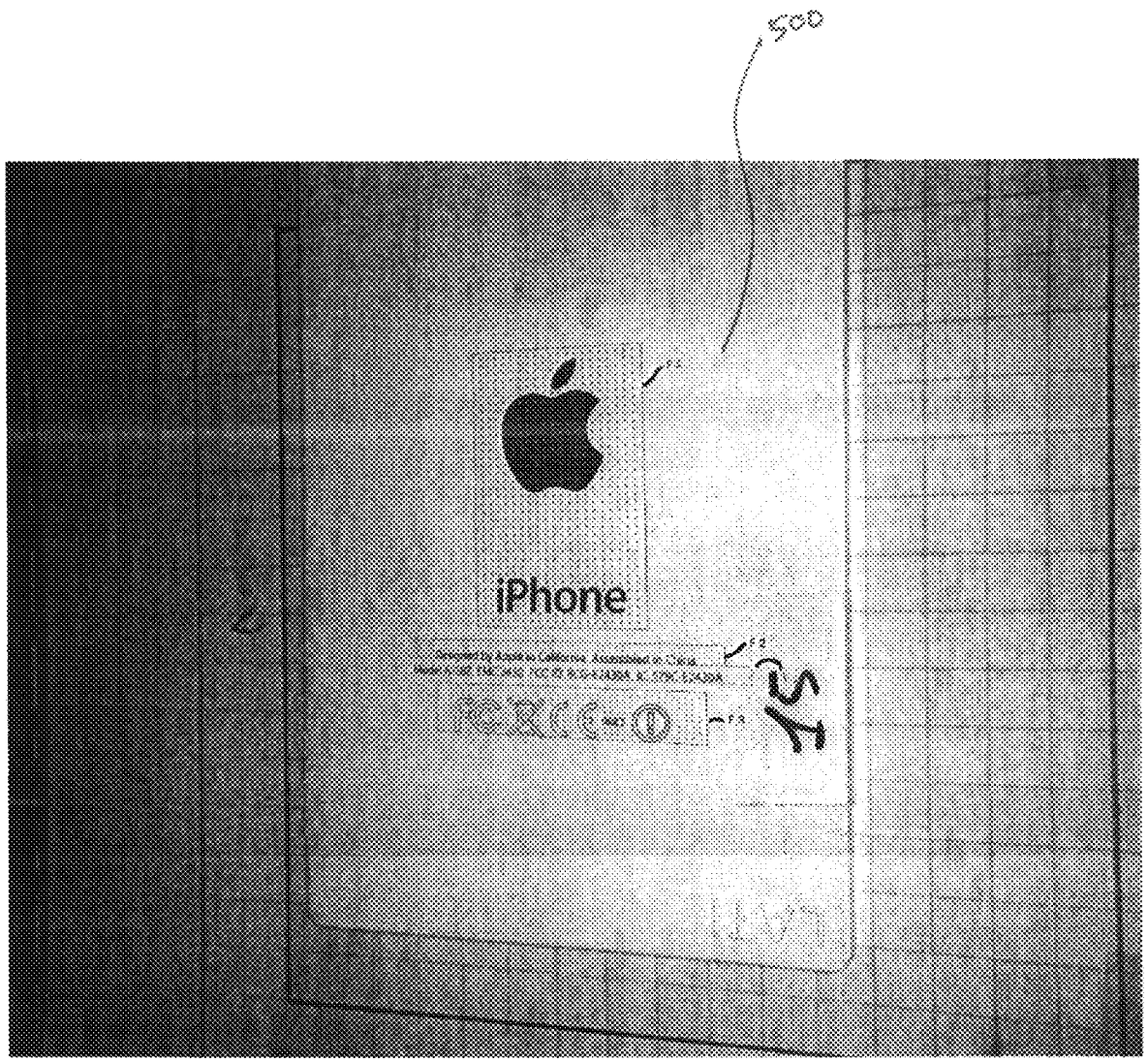
FIG. 8 is an illustration of the marked image during verification in accordance with invention.
Figure 9:
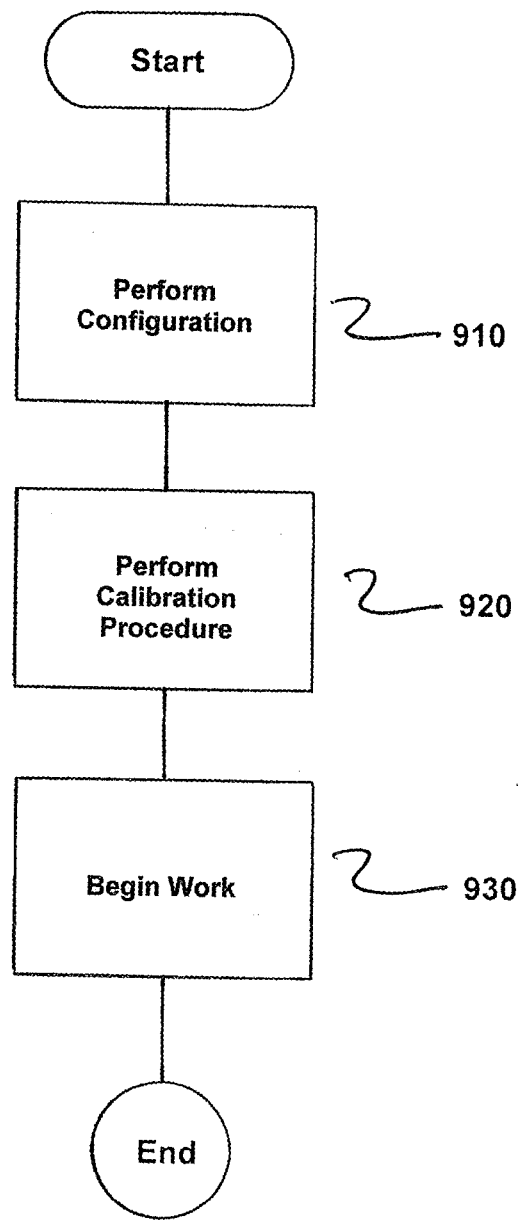
FIG. 9 is a flowchart of the process in accordance with the invention.

FIG. 8 is a flowchart of the method in accordance with the invention. The method comprises performing a configuration which is marked on a target surface by a marker, as indicated in step 910. Here, the configuration comprises creating a layout prototype, defining fixed parts in the layout prototype and defining variable parts in the layout prototype, as indicated. Pursuant to performing the configuration, a detailed size for each defined fixed part and a detail size of each defined variable part are also created. Moreover, a quality grading grid is created for each defined fixed part and for each defined variable. The configuration also includes the creation of a verification structure. Here, the image is divided via the grid defined by the detail size for each defined part. The grid at this stage is composed of nodes, where each node contains its position in the grid and its node type, such as black, white or edges. It is at this point that the defined layout prototype and its verification structure is forwarded from the marker to, i.e., shared with, the code reader, such that both the marker and the code reader are provided with the data.

Next, a calibration procedure is performed to calibrate the code reader to a reference point, as indicated in step 920. In an embodiment, a machine vision homography calibration process is implemented. Here, the pixel coordinate system of the scan head is mapped to a "world" coordinate system. This mapping defines the relationship between a distance measured in pixels in the scan head versus the actual distance in inches or millimeters of an object being imaged. As stated, homography calibration processes are generally known, and are beyond the scope of the instant application and, therefore, they will not be discussed in detailed herein.

Next, the work is begun, which includes marking the target surface with a created layout and verifying the layout with a predetermined metric system, as indicated in step 930. The work also includes automatically recreating a new verification structure for the variable parts and capturing an image of the marked layout. Here, the following AIM-DPM/ISO-IEC 29158 metrics, e.g., Cell Modulation, Cell Contrast, Grid Non Uniformity, Axial Non Uniformity, Fixed Pattern Damage and Print Growth, are computed based on the new verification structure for the variable parts.

Thus, the disclosed embodiments of the process in accordance with the invention allow verification of the quality of marking on any type of surface and for any type of shape in a manner that maintains the stability and reliability of DPM metrics developed for 2D codes. Furthermore, using the disclosed embodiments of the process in accordance with the invention mark and read applications can reach a level of integration that is higher than the simple sum of a marker and an imager onto which code grading algorithms are performed. Consequently, it becomes possible to focus on marking defects in a manner that is independent from variations or imperfections of the background upon which the mark or layout is applied. Conversely, pattern matching detects differences in both the symbol and background.

Thus, while there have been shown, described and pointed out fundamental novel features of the invention as applied to a preferred embodiment thereof, it will be understood that various omissions and substitutions and changes in the form and details of the method may be made by those skilled in the art without departing from the spirit of the invention. For example, it is expressly intended that all combinations of those method steps which perform substantially the same function in substantially the same way to achieve the same results are within the scope of the invention. Moreover, it should be recognized method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process for generic shape quality verification in a mark and read system, the method comprising:
   performing within the mark and read system a configuration to (i) create a layout prototype to be marked on a target surface of a workpiece by a marker of the mark and read system, to (ii) define fixed parts in the layout prototype and to (iii) define variable parts in the created layout prototype;
   performing a calibration procedure to calibrate a code reader of the mark and read system to a reference point; and
   marking the target surface with a created layout and verifying the layout with a predetermined metric system.

2. The process of claim 1, wherein said performing the configuration further comprises:
   defining a detail size for each defined fixed part and each defined variable part in the created layout prototype;
   creating a quality grading grid within the define fixed parts and the defined variable parts; and
   creating a verification structure;
   wherein for each defined part the layout prototype is divided via the quality grid defined by the detail size.

3. The process of claim 2, further comprising:
   forwarding the created layout prototype and an associated verification structure from the marker to the code reader.

4. The process of claim 1, wherein said calibration comprises a machine vision homography calibration process.

5. The process of claim 1, wherein the predetermined metric system is in accordance with Automatic Identification and Mobility (AIM) Direct Part Mark (DPM) Quality Guideline/International Organization for Standardization (ISO)/International Engineering Consortium (IEC) standard 29158.

6. The process of claim 5, wherein metrics of the AIM-DPM/ISO-IEC 29158 comprise at least one of Cell Contrast, Cell Modulation, Grid Non Uniformity, Axial Non Uniformity, Fixed Pattern Damage, Unused Error Correction and Print Growth.

7. The process of claim 2, wherein a 2-dimensional code grid verification structure is replaced by the created verification structure and a binary value of a code grid module is replaced with a binary value obtained from the created layout.

8. The process of claim 7, wherein the Cell Contrast, Cell Modulation, Grid Non Uniformity, Axial Non Uniformity, Fixed Pattern Damage, Unused Error Correction and Print Growth are real numbers.

9. The process of claim 7, wherein the Cell Contrast, Cell Modulation, Grid Non Uniformity, Axial Non Uniformity, Fixed Pattern Damage, Unused Error Correction and Print Growth are a letter grade.

10. The process of claim 9, wherein the letter grades are at least A, B, C, D, E and F.

* * * * *